(12) United States Patent
Lim et al.

(10) Patent No.: US 9,479,036 B2
(45) Date of Patent: Oct. 25, 2016

(54) HIGH TORQUE, LOW INERTIA DIRECT DRIVE MOTOR

(75) Inventors: Howe Yuen Lim, Singapore (SG); Chai Meng Goh, Singapore (SG)

(73) Assignee: AKRIBIS SYSTEMS PTE LTD, Singapore (SG)

( * ) Notice: Subject to any disclaimer, the term of this patent is extended or adjusted under 35 U.S.C. 154(b) by 22 days.

(21) Appl. No.: 14/239,537

(22) PCT Filed: Aug. 31, 2011

(86) PCT No.: PCT/SG2011/000300
§ 371 (c)(1),
(2), (4) Date: Apr. 22, 2014

(87) PCT Pub. No.: WO2013/032401
PCT Pub. Date: Mar. 7, 2013

(65) Prior Publication Data
US 2014/0300217 A1    Oct. 9, 2014

(51) Int. Cl.
*H02K 16/04*    (2006.01)
*H02K 16/00*    (2006.01)
*H02K 21/12*    (2006.01)

(52) U.S. Cl.
CPC ............. *H02K 16/04* (2013.01); *H02K 11/225* (2016.01); *H02K 16/00* (2013.01); *H02K 21/12* (2013.01)

(58) Field of Classification Search
CPC ...... H02K 16/04; H02K 16/00; H02K 21/24; H02K 21/12; H02K 11/225

USPC ................... 310/112, 113, 114, 101, 156.35, 310/156.32, 266, 184, 198
See application file for complete search history.

(56) References Cited

U.S. PATENT DOCUMENTS

| | | | |
|---|---|---|---|
| 4,678,952 A * | 7/1987 | Peterson et al. | 310/83 |
| 5,021,698 A * | 6/1991 | Pullen et al. | 310/156.29 |
| 5,345,133 A * | 9/1994 | Satake | 310/266 |
| 5,751,089 A * | 5/1998 | Stridsberg | 310/266 |
| 7,723,888 B2 * | 5/2010 | Petek | 310/156.35 |
| 7,791,245 B1 * | 9/2010 | Hao et al. | 310/266 |
| 7,902,712 B2 * | 3/2011 | Nakamasu et al. | 310/156.57 |
| 2004/0108781 A1 * | 6/2004 | Razzell et al. | 310/112 |
| 2007/0278886 A1 * | 12/2007 | Fujiwara | H02K 1/276 310/156.53 |
| 2009/0184599 A1 * | 7/2009 | Kanazawa et al. | 310/195 |

* cited by examiner

*Primary Examiner* — Terrance Kenerly
*Assistant Examiner* — Alexander Singh
(74) *Attorney, Agent, or Firm* — Leong C. Lei

(57) ABSTRACT

A high torque, low inertia direct drive motor comprises a circular outer stator 21 and a circular inner stator 25 and a ring of magnets 23a, 23b, 23c. The ring of magnets 23a, 23b, 23c is held by a support structure 31, said ring of magnets 23a, 23b, 23c positioned between the circular outer stator 21 and the circular inner stator 25. The circular outer stator 21 and ring of magnets and circular inner stator and ring of magnets are separated by an air gap. The circular outer stator 21 and circular inner stator 25 each have a plurality of teeth with coils wound around the teeth. The teeth of the circular inner stator 44a, 44b, 44c are aligned in the same radial direction as the teeth of the circular outer stator 46a, 46b, 46c.

12 Claims, 7 Drawing Sheets

PRIOR ART

HIGH TORQUE, LOW INERTIA DIRECT DRIVE MOTOR

FIELD OF THE INVENTION

The present invention relates to a new direct drive rotary motor design which uses an inner stator core and an outer stator core, with magnets in between the two stator cores, attached to a rotor structure, without any magnet back iron. The motor is further integrated with bearings, and feedback device such as a rotary encoder or a resolver. The invention provides a motor with a low rotor inertia, but with higher torque output, and is suitable for use in factory automation.

BACKGROUND AND DISCUSSION OF PRIOR ART

Brushless servo motors have been widely used in the industry, especially in the area of factory automation. The brushless servo motors that are most commonly used are those with a continuous power output range of 100 W to 1 KW. These motors are produced in high volumes, and typically with 3 phases which work with standard servo amplifiers that are commonly available. Hence, brushless servo motors are very economical. However, for many applications, the torque produced by such servo motors is not sufficient, while the speed required is much less than the nominal speed of these motors. Hence, many transmission devices such as gears and belts are used with servo motors to increase the torque output, as well as reduce the speed of rotation. The transmission devices cause inaccuracies due to backlash and are susceptible to wear and tear. Moreover, the transmission devices add to the moment of inertia of the motor, thereby reducing its dynamic performance.

Therefore, in recent years, direct drive rotary servo motors have become more common, and are replacing more and more conventional brushless servo motors in applications. The direct drive servo motor has a bigger diameter and produces a larger torque, which enables it to drive the load directly without any transmission device. Since the torque required from a direct drive rotary motor has to be large enough to drive a load directly, various methods have been used to increase torque output.

Figure 1:
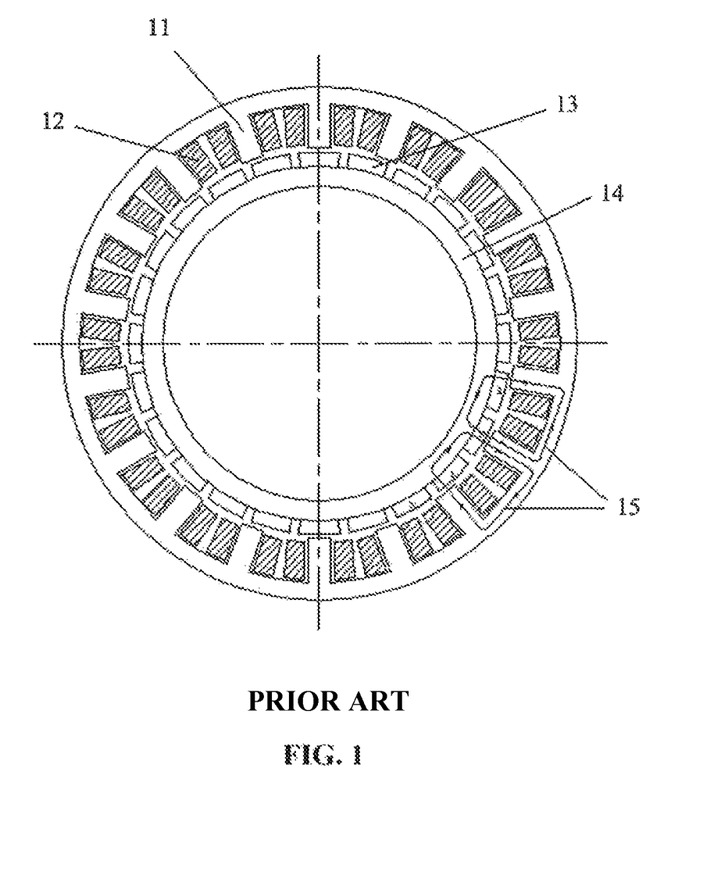
FIG. 1 shows the cross section view of the motor of the prior art.

FIG. 1 (prior art) shows a conventional direct drive motor. The motor comprises a stator 11, which is typically made from stacked laminated silicon steel sheets, with coils 12 surrounding the teeth of the stator 11. Rare earth magnets 13 are placed on the outer diameter of the rotor 14. The rotor 14 can be made from a solid piece of magnetic steel which has very good permeability, or it can be made from stacked laminated silicon steel steels like the stator 11. The magnetic flux circuit 15 shows that the flux flows through the magnets with different polarity, and the flux is closed on the stator coil back iron, as well as the rotor magnet back iron.

U.S. Design Pat. No. US D565,617 S illustrates a direct drive motor using the conventional design described above. Instead of an inner rotor, another U.S. Pat. No. 4,853,567 describes a direct drive motor with an inner stator and outer rotor. Since the moment of inertia of a rotating object is proportional to the square of the distance between the centre of rotation and the centre of mass of the object, with an outer rotor, the rotor inertia becomes significantly larger.

To increase the torque of a direct drive motor, one method used is to add cooling to the motor. US Patent Publication No. 2008/0164773 A1 describes a cooling method for the stator of a direct drive motor. While cooling can increase the continuous torque of a motor, the additional facilities required include a circulating coolant and a heat exchanger to remove heat. The maintenance of these facilities adds to the costs of using such a motor.

Another way to increase the torque of a motor is described in US patent application US 2011/0101810 A1, where two rotors are connected in series to increase the torque output. A disadvantage of this design is that the motor becomes longer in the axial direction, which is undesirable for applications where there is a height constraint.

What is desirable is a motor with a low rotor inertia, but with higher torque output.

SUMMARY OF INVENTION

It is an object of this invention to provide a direct drive motor, with increased torque, and reduced moment of inertia, to achieve higher dynamic performance. The invention uses an inner stator core and an outer stator core, with magnets in between the two stator cores attached to a rotor structure, without any magnet back iron. The design is further integrated with bearings, and feedback device such as a rotary encoder or resolver.

A first object of the inventive high torque, low inertia direct drive motor comprises a circular outer stator and a circular inner stator and a plurality of magnets forming a circular ring of magnets, the ring of magnets held by a support structure, said ring of magnets positioned between the circular outer stator and the circular inner stator with an air gap between the magnets and the circular outer stator and an air gap between the magnets and the circular inner stator;
the circular outer stator having a plurality of teeth;
the circular inner stator having a plurality of teeth;
coils are wound around the teeth of the circular inner stator and the circular outer stator;

such that the plurality of teeth of the circular inner stator are aligned in the same radial direction as the plurality of teeth of the circular outer stator.

Preferably, the support structure is assembled with a bearing to a motor housing.

Preferably, the air gap between the ring of magnets and the circular outer stator and the air gap between the ring of magnets and the circular inner stator are of the same height.

Preferably, the support structure is made from low density non magnetic material.

More advantageously, the support structure is made from aluminum.

Alternatively, the support structure is made from fiber reinforced plastic.

The support structure can also be from resin material.

Preferably, the support structure has pockets which are machined for mounting of magnets.

Preferably, the high torque, low inertia direct drive motor has a feedback device mounted in the motor, such as an encoder or a resolver to provide position feedback for servo control.

Preferably, the high torque, low inertia direct drive motor has a combination of the slot/pole of 18 slots with 24 poles.

Alternatively, the high torque, low inertia direct drive motor has a combination of the slot/pole at 18 slots with 16 poles.

It is possible the high torque, low inertia direct drive motor has a combination of the slot/pole at 21 slots with 16 poles.

It is possible the high torque, low inertia direct drive motor has a combination of the slot/pole at 27 slots with 24 poles.

It is also possible the high torque, low inertia direct drive motor has any other combination of number of slots/poles that work with three phase brushless commutation.

Preferably, the high torque, low inertia direct drive motor has a encoder sensor or read head mounted onto a motor housing inside the support structure, such that a cable of the sensor or read head can go through an inner hole of the motor, through a base of the motor.

Preferably, the high torque, low inertia direct drive motor has a rotor mounted to the inner ring of the bearing while keeping the outer ring stationary.

Alternatively, the high torque, low inertia direct drive motor has a rotor is mounted to the outer ring of the bearing while keeping the inner ring stationary.

DETAILED DESCRIPTION OF PREFERRED EMBODIMENT

Figure 2:
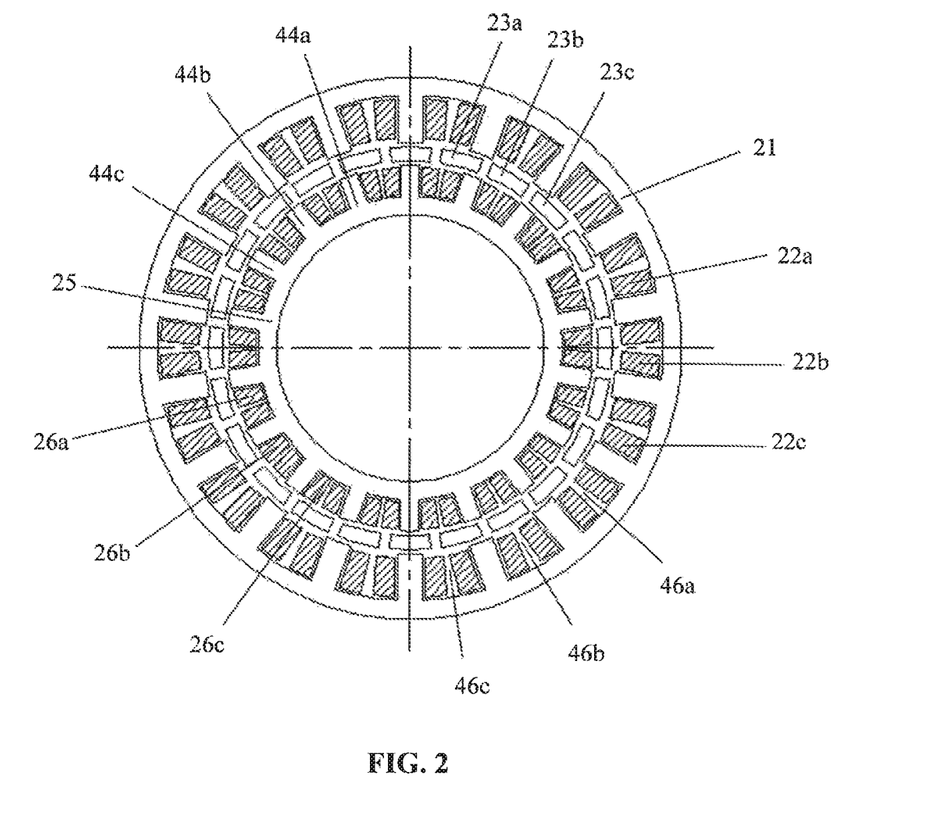
FIG. 2 shows the cross section view of the direct drive rotary motor according to this invention.

FIG. 2 shows the cross section view of the direct drive rotary motor according to our invention. There are two stators, an outer stator 21 and an inner stator 25. The outer stator 21 is similar to the stators of conventional direct drive motors. For the inner stator 25, the inner stator teeth 44a, 44b, 44c face outwards in the radial direction, aligned to the outer stator teeth 46a, 46b, 46c of the outer stator 21. Both stators 21, 25 are preferably made from stacked laminated silicon steel sheets. Outer stator coils 22a, 22b, 22c and inner stator coils 26a, 26b, 26c are wound around the outer stator teeth 46a, 46b, 46c of outer stator 21 and inner stator teeth 44a, 44b, 44c of inner stator 25 respectively. Rare earth magnets 23a, 23b, 23c are positioned between outer stator 21 and inner stator 25, with air gaps between the outer stator teeth 46a, 46b, 46c and the magnets 23a, 23b, 23c. There are air gaps between inner stator teeth 44a, 44b, 44c and the magnets 23a, 23b, 23c. In FIG. 2, the direct drive rotary motor has 18 slots and 24 poles.

Figure 3:
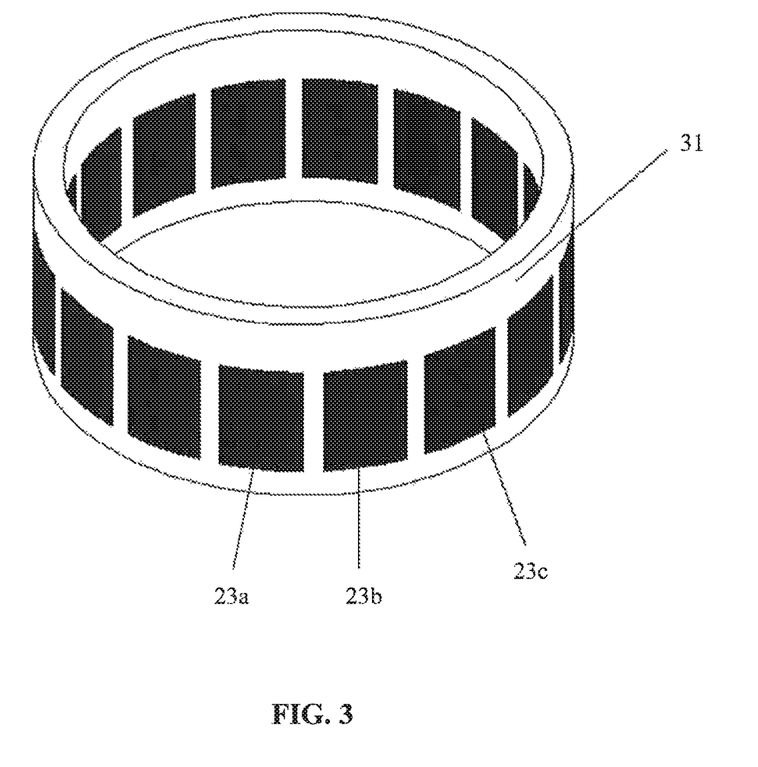
FIG. 3 shows magnets mounted on a support structure.

It can be observed that magnets 23a, 23b, 23c are not attached to any back iron material and are not free to float in the air, but are mounted on a support structure 31, as shown in FIG. 3. In this new design, the support structure 31 need not and should not be magnetically permeable. A light weight, non magnetic material, such as aluminum or fiber reinforced plastic or resin material can be used. The material need not be magnetically permeable because this support structure 31 does not close the magnetic flux as in the case of the conventional motor design. A possible design involves machining pockets in the support structure 31 that fit the magnets 23a, 23b, 23c exactly. Therefore the magnets 23a, 23b, 23c are fixed easily into their respective position and orientation. FIG. 3 shows the magnets 23a, 23b, 23c inserted into the pockets of the support structure 31. The faces of the magnet 23a, 23b, 23c may be flushed with the surface of the support structure 31. Alternatively, the magnets 23a, 23b, 23c can be slightly thinner and may be embedded into the support structure 31. The magnets 23a, 23b, 23c can be fixed onto these pockets holders and held thereto by strong epoxy.

Figure 4:
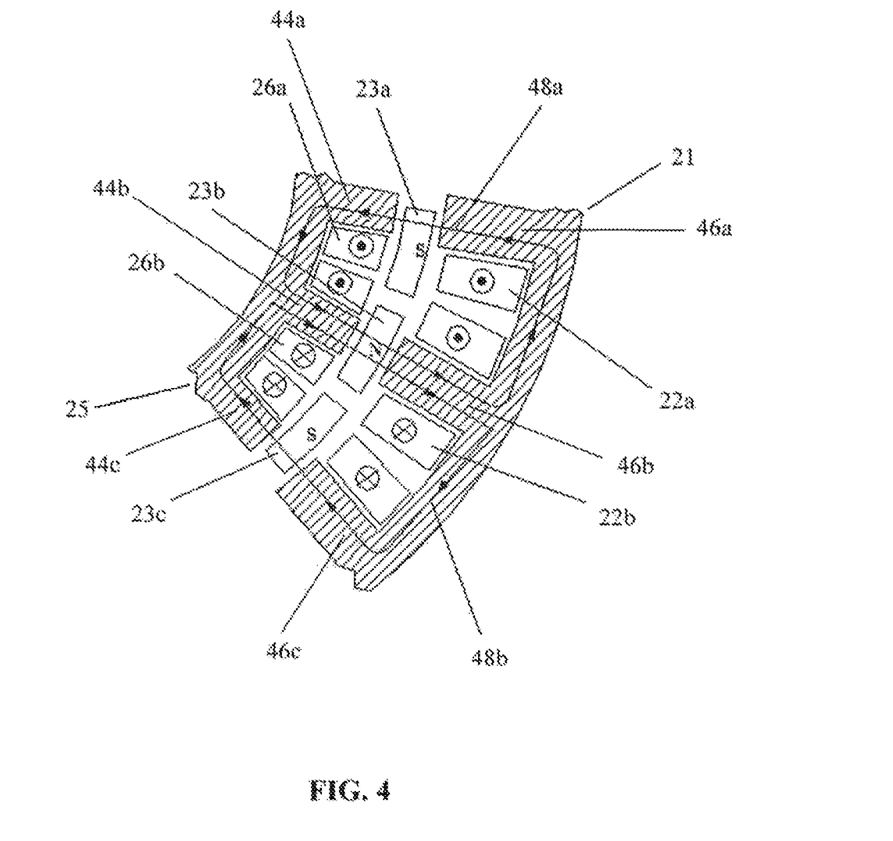
FIG. 4 is an expanded view of a cross section of a part of the direct drive rotary motor.

FIG. 4 is a expanded view of a cross section of a part of the direct drive rotary motor with magnets 23a, 23b, 23c having alternating polarity, and which is facing on one side the outer stator 21 and facing on the other side, the inner stator 25. The inner stator teeth 44a, 44b, 44c are aligned to the outer stator teeth 46a, 46b, 46c, although the inner stator teeth 44a, 44b, 44c are smaller in size. The direct drive rotary motor is designed such that coils of outer stator 22a, 22b, 22c has current flowing in the same direction as coils of inner stator 26a, 26b, 26c, which is negative as shown in FIG. 4. Similarly, outer stator coils 22a, 22b, 22c and inner stator coils 26a, 26b, 26c have the same direction of current flow which is positive. The flux circuit 48a cuts across magnets 23a and 23b in a radial direction, so that it is parallel to the polarity of the magnets 23a, 23b. Similarly, flux circuit 48b also cuts across magnets 23b and 23c in a radial direction. With this design, flux leakage between magnets 23a, 23b, 23c is greatly reduced. Moreover, since there are two sets of coils, one set in the outer stator 22a, 22b, 22c and another in the inner stator 26a, 26b, 26c, the torque produced is much higher than the conventional design which has only one set of stator coils. Furthermore, since the rotor does not have any back iron, it has a very low moment of inertia. Therefore the direct drive rotary motor according to this invention has a low rotor inertia, but with higher torque output.

While the motor shown in FIG. 2 does not have extended tooth tips associated with the slots, it is also possible to apply such tooth tip design with this invention, to reduce cogging torque. While the magnets 23a, 23b, 23c shown in FIG. 3 are aligned parallel to the axis to rotation, it is also possible to have skew magnets, in order to reduce cogging torque. The coil laminations can also be skewed instead of the magnets 23a, 23b, 23c, to achieve the same purpose of reducing cogging torque. In FIG. 2, a direct drive rotary motor with 18 slots and 24 poles is shown. The direct drive rotary motor according to this invention can also be made from other slot/pole combinations, such as a motor with 18 slots, 16 poles, or a motor with 21 slots, 16 poles, or a motor with 27 slots, 24 poles etc, or any other slot/pole combinations that work with three phase brushless commutation. It is understood that such variations fall within the spirit and scope of the invention.

It should also be noted that this direct drive rotary motor described does not need any special control algorithm, as the outer stator 21, the inner stator 25 and the outer stator coils 22a, 22b, 22c and inner stator coils 26a, 26b, 26c are designed to work with standard, three phase servo amplifier power electronics. In this design, the inner stator teeth 44a, 44b, 44c and the outer stator teeth 46a, 46b, 46c are aligned, so that each tooth of the inner stator 25 is facing a corresponding tooth of the outer stator 21. PCT Publication No WO 93/15547 also describes a rotary motor with two coil assemblies, but the two coil assemblies need to be offset from each other, such that the emf of the phase of one coil assembly is substantially 90 electrical degrees apart from the emf of the phase of the other coil assembly, in order for the motor to work.

Figure 5:
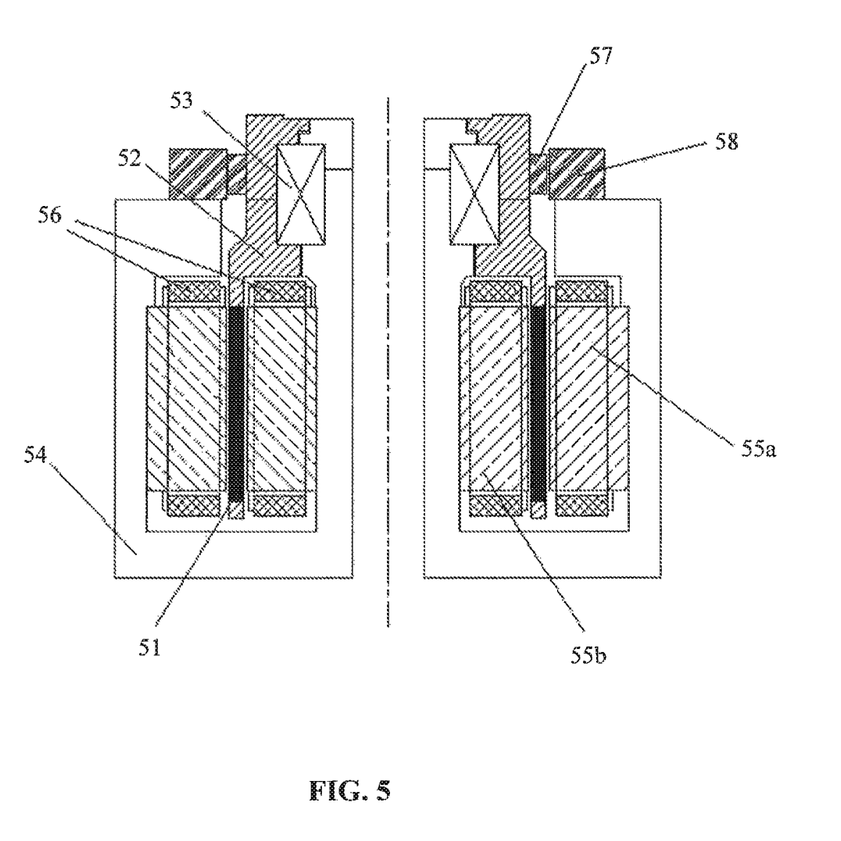
FIG. 5 shows a fully integrated direct drive rotary motor according to the invention.

FIG. 5 shows a fully integrated direct drive rotary motor according to the invention. The magnets 51 are held to a moving structure 52, which is the rotor of the motor. The rotor 57 is assembled with a bearing 53 to the motor housing

54. In this way, the magnets 51 are positioned between the outer stator 55a and the inner stator 55b, with equal air gaps between the magnets 51 and the stators 55a, 55b. Coils 56 are wound onto both the inner stator teeth and outer stator teeth (not shown). With this configuration, the rotor has a very low moment of inertia due to the fact that is does not have any back iron. The rotor material also can be a low density material, since it needs not be magnetically permeable, thereby reducing its moment of inertia further. A feedback device may be installed as an option, so that the direct drive torque motor can be run in closed loop control, as a servo motor. A resolver with a rotor 57 and resolver stator 58 can be used for this purpose. Similarly, the resolver with a rotor 57 can be the rotating disk of an encoder, while the resolver stator 58 can be the sensor read head of an encoder, where the encoder can be the optical type with a disk or the magnetic type.

Figure 6:
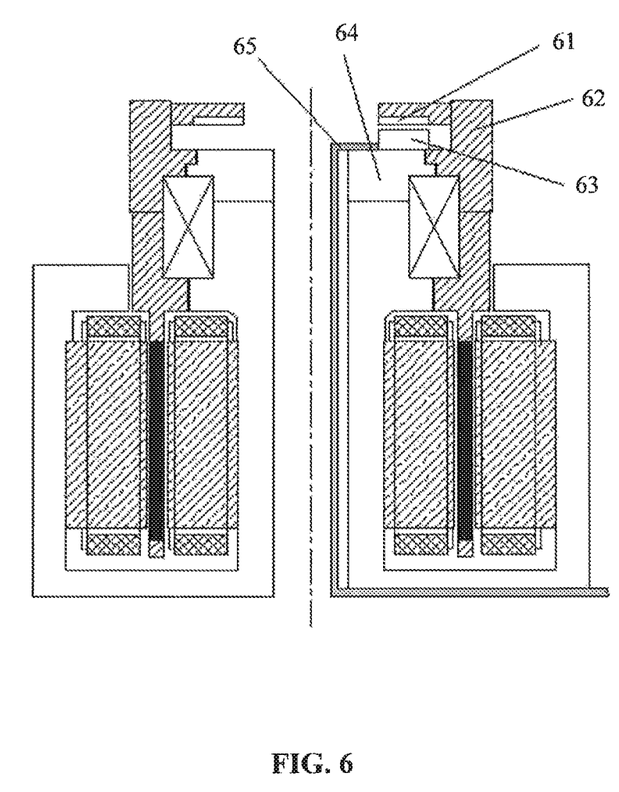
FIG. 6 shows another embodiment of the fully integrated direct drive rotary motor according to the invention.

FIG. 6 shows another embodiment of the fully integrated direct drive rotary motor according to the invention. In this embodiment or configuration, where an encoder grating 61 is mounted to the rotor 62, while the encoder read head 63 is mounted to the motor housing 64. Since the encoder read head 63 is fixed to the inside of the motor housing 64, the cable 65 exits from the inner hole of the motor, through the base of the motor.

Figure 7:
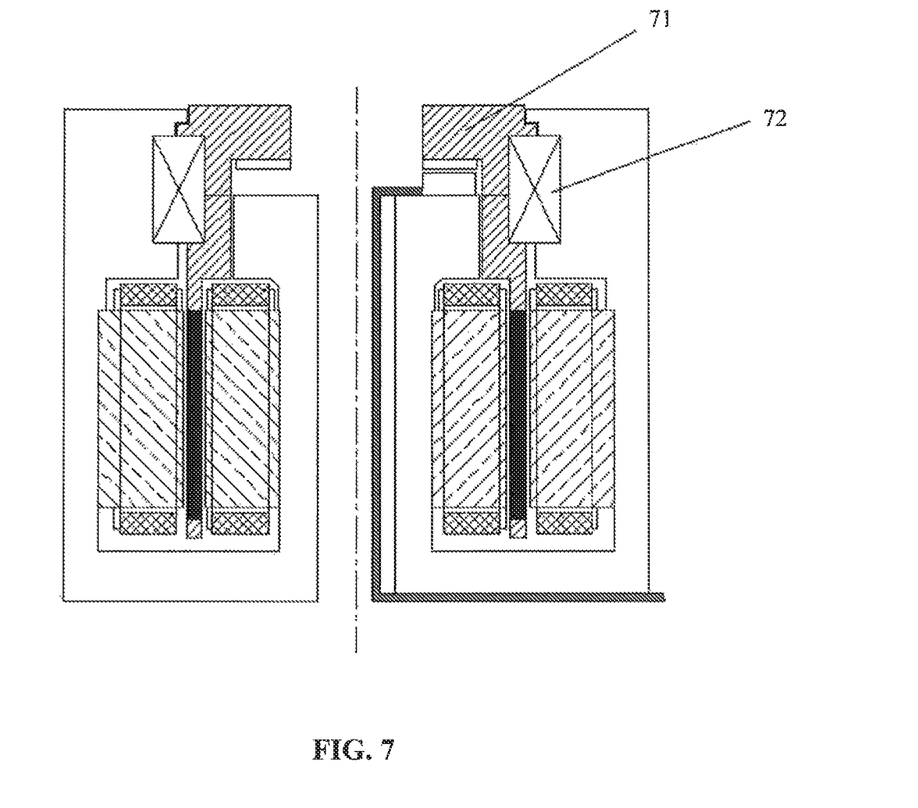
FIG. 7 is a third embodiment of the fully integrated direct drive rotary motor according to the invention.

FIG. 7 is a third embodiment of the fully integrated direct drive rotary motor according to the invention. In this third embodiment or configuration, the rotor is mounted to the inner ring of the bearing 72, instead of the outer ring of the bearing as shown in FIG. 5 and FIG. 6. With this embodiment, the rotating inertia is reduced further since the smaller inner ring of the bearing rotates while the outer ring is kept stationary.

It should be noted that the different configurations or embodiments shown herein are examples of the present invention. Other conceivable combinations are possible but it is understood that such variations or modifications fall within the spirit and scope of the invention.

ADVANTAGEOUS EFFECTS OF THE INVENTION

This direct drive rotary motor is designed to drive a load directly, without any transmission device. This reduces the moment of inertia of the rotating part. Moreover, an encoder or resolver can be mounted to measure the rotation position directly. Any inaccuracies due to backlash are eliminated. Any wear and tear associated with transmission devices is also eliminated.

With this invention, since there are two sets of coils, one set in the outer stator and another in the inner stator, the torque produced is much higher than the conventional design which has only one set of stator coils.

The rotor has a very low moment of inertia due to the fact that it does not have any back iron. The rotor material can be a low density material, since it needs not be magnetically permeable, thereby reducing its moment of inertia further. With a higher torque and lower inertia, the dynamic performance of this motor is enhanced greatly.

The invention claimed is:

1. A high torque, low inertia direct drive motor having mounted with an encoder or a resolver, comprising a circular outer stator 21 and a circular inner stator 25 and a plurality of magnets 23a, 23b, 23c and forming a circular ring of magnets 23a, 23b, 23c, wherein the ring of magnets 23a, 23b, 23c is held by a support structure 31, said ring of magnets 23a, 23b, 23c positioned between the circular outer stator 21 and the circular inner stator 25 with an air gap between the magnets 23a, 23b, and 23c and the circular outer stator 21 and an air gap between the magnets 23a, 23b, 23c and the circular inner stator 25;

wherein the circular outer stator 21 has a plurality of teeth 46a, 46b, 46c;

wherein the circular inner stator 25 has a plurality of teeth 44a, 44b, 44c;

wherein coils are wound around the teeth of the circular inner stator 26a, 26b, 26c and the teeth of the circular outer stator 22a, 22b, 22c; and wherein the plurality of teeth of the circular inner stator 44a, 44b, 44c are aligned in the same radial direction as the plurality of teeth of the circular outer stator 46a, 46b, 46c, and the encoder is arranged to provide position feedback for servo control, wherein the encoder comprises a stationary part that is mounted onto a motor housing and a moving part that is mounted to the support structure 31 that holds the ring of magnets between the circular outer stator and the circular inner stator such that a cable of the encoder goes through an inner hole of the motor through a base of the motor; and wherein the motor is a combination of the slot pole at 18 slots with 24 poles.

2. The high torque, low inertia direct drive motor having mounted with an encoder as claimed in claim 1 wherein the support structure 31 is assembled with a bearing to a motor housing.

3. The high torque, low inertia direct drive motor having mounted with an encoder as claimed in claim 1 wherein the air gap between the ring of magnets 23a, 23b, 23c and the circular outer stator 21 and the air gap between the ring of magnets 23a, 23b, 23c and the circular inner stator 25 are of the same height.

4. The high torque, low inertial direct drive motor having mounted with an encoder as claimed in claim 1, wherein the support structure 31 is made from material selected from aluminum, reinforced plastic, or resin material.

5. The high torque, low inertial direct drive motor having mounted with an encoder as claimed in claim 1 wherein pockets are machined for mounting of magnets 23a, 23b, 23c.

6. The high torque, low inertia direct drive motor as claimed in claim 1 having a combination of the slot/pole at 18 slots with 16 poles.

7. The high torque, low inertia direct drive motor as claimed in claim 1 having a combination of the slot/pole at 21 slots with 16 poles.

8. A high torque, low inertia direct drive motor having mounted with an encoder or a resolver, comprising a circular outer stator 21, and a circular inner stator 25 and a plurality of magnets 23a, 23b, 23c, and forming a circular ring of magnets 23a, 23b, 23c, wherein the ring of magnets 23a, 23b, 23c is held by a support structure 31, said ring of magnets 23a, 23b, 23c positioned between the circular outer stator 21 and a circular inner stator 25 with an air gap between the magnets 23a, 23b and 23c and the circular outer stator 21 and the air gap between the magnets 23a, 23b, 23c and the circular inner stator 25;

wherein the circular outer stator 21 has a plurality of teeth 46a, 46b, 46c;

wherein the circular inner stator 25 has a plurality of teeth 44a, 44b, 44c;

wherein coils are wound around the teeth of the circular inner stator 26*a*, 26*b*, 26*c* and the teeth of the circular outer stator 22*a*, 22*b*, 22*c*; and wherein the plurality of teeth of the circular inner stator 44*a*, 44*b*, 44*c* are aligned in the same radial direction as the plurality of teeth of the circular outer stator 46*a*, 46*b*, 46*c*, and the encoder is arranged to provide position feedback for servo control, wherein the encoder comprises a stationary part that is mounted onto a motor housing and a moving part that is mounted to the support structure 31 that holds the ring of magnets between the circular outer stator and the circular inner stator such that a cable of the encoder goes through an inner hole of the motor through a base of the motor, and wherein the motor is a combination of the slot/pole at 27 slots with 24 poles.

9. The high torque, low inertia direct drive motor having mounted with an encoder or resolver as claimed in claim 1 wherein the encoder sensor or read head 63 is mounted onto a motor housing 64 inside the support structure 31, such that a cable of the sensor or read head 63 goes through an inner hole of the motor, through a base of the motor.

10. The high torque, low inertia direct drive motor having mounted with an encoder or resolver as claimed in claim 1 wherein the rotor 57 is mounted to the inner ring of the bearing 53 while keeping the outer ring stationary.

11. The high torque, low inertia direct drive motor having mounted with an encoder or resolver as claimed in claim 1 wherein the rotor 57 is mounted to the outer ring of the bearing 53 while keeping the inner ring stationary.

12. The high torque, low inertia direct drive motor as claimed in claim 1 or claim 8 having any other combination of number of slots/poles that work with three phase brushless commutation.

* * * * *